United States Patent
Fernlund

[11] 3,740,108
[45] June 19, 1973

[54] CYLINDRICAL ROLLER BEARING

[75] Inventor: Lars Martin Ingemar Fernlund, Hindas, Sweden

[73] Assignee: SKF Industrial Trading and Development Company N.V., Amsterdam, Netherlands

[22] Filed: Nov. 15, 1971

[21] Appl. No.: 198,568

[52] U.S. Cl. .............................................. 308/212
[51] Int. Cl. ............................................. F16c 33/00
[58] Field of Search .................. 308/194, 212, 213, 308/210

[56] References Cited
UNITED STATES PATENTS

| | | | |
|---|---|---|---|
| 1,328,179 | 1/1920 | Meier | 308/213 |
| 1,520,053 | 12/1924 | Drolschmann | 308/213 |
| 1,625,812 | 4/1927 | Leon | 308/212 |
| 2,071,628 | 2/1937 | Hedgcock | 308/194 |

*Primary Examiner*—Charles J. Myhre
*Assistant Examiner*—Frank Susko
*Attorney*—Dexter N. Shaw, Eugene E. Renz, Jr., John C. Dorfman et al.

[57] ABSTRACT

A rolling bearing assembly comprising inner and outer ring members having confronting raceways, a plurality of roller elements in the annular space between the raceways, each of said rolling elements having a peripheral surface confronting the raceways, said raceways and peripheral surface of the rolling elements being of a predetermined configuration whereby the peripheral surface of said rolling elements adjacent the axial ends thereof is spaced from the raceways and thereby is not under load when the bearing assembly is subjected to a predetermined axial load.

5 Claims, 6 Drawing Figures

CYLINDRICAL ROLLER BEARING

The present invention relates to cylindrical roller bearings, and the purpose is to increase the life length of such bearings which are axially loaded. According to the invention, this is achieved by that the rolling bodies and/or the raceways of the bearing are crowned, whereby the crowning has a comparatively small radius, and the contact between the rolling bodies and the raceways occurs against at least one convex surface, which gives the advantages stated below. In cylindrical roller bearings where the rolling bodies and the raceways have a purely cylindrical shape, great tension concentrations occur at the end parts of the rolling bodies when the bearing is radially loaded. To avoid this, it is known to make the rolling bodies and/or the raceways crowned with a large crowning radius. Hereby a more even tension distribution is achieved over the whole length of the rolling body when it is radially loaded. At a comparatively moderate axial load of such a bearing, however, comparatively large tension concentrations occur at the end parts even of these rolling bodies, which causes a considerable decrease of the life length of the bearing.

According to the present invention, it is now suggested that the rolling bodies and/or the raceways are crowned with such a small radius that when the bearing takes up a radial load the tension distribution over the rolling bodies takes up only a central part of these and leaves the end parts tension-free. When the bearing is moderately loaded axially, the tension zone of the rolling bodies will thereby, with a maintained size and shape, be moved at one direction or the other along the rolling bodies, dependent on in which direction the load is applied. If a great load is applied, the tension zone will be moved out to the end part of the rolling bodies, where a tension concentration will occur if the axial load is further increased.

In those cases where the tension zone over the rolling bodies does not reach the end part, the applied axial load does not cause a decreased life length of the bearing raceways at a given radial load. If the life length of the parts of the bearing which transfer the axial load is long in comparison to the life length of the raceways, the total life length of the bearing will thus be independent of the axial load up to a certain limit.

These and other objects of the present invention and the various features and details of the operation and construction thereof are hereinafter more fully set forth with reference to the accompanying drawings wherein.

Figure 1:
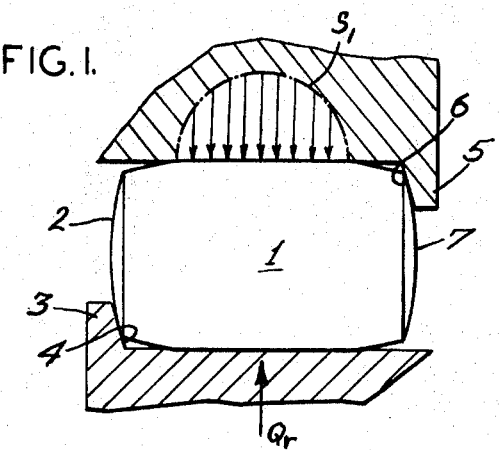
FIG. 1 is a fragmentary sectional view of a portion of a bearing assembly in accordance with the present invention.
Figure 2:
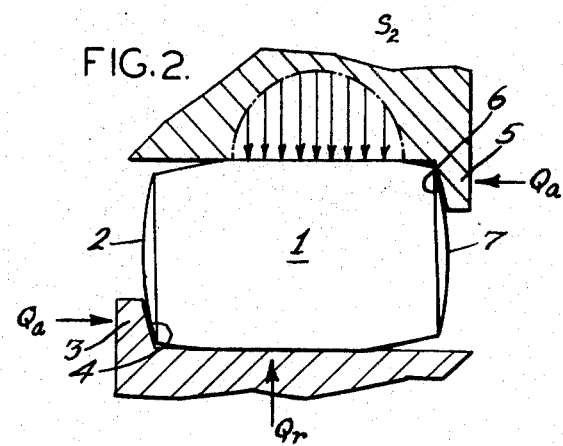
FIG. 2 is a fragmentary view similar to FIG. 1 showing the bearing subjected to both radial and axial loads.

On the accompanying drawing in FIG. 1 a rolling body and parts of the outer and inner ring of a bearing are shown according to one embodiment of the invention where the rolling bodies are crowned and the raceways are cylindrical, which bearing is subjected only to radial load. In FIG. 2, corresponding parts are shown when the bearing is subjected to both radial and axial loads. The outer and the inner ring of the bearing according to the shown embodiment are provided with radial flanges 3,5 against which the end surfaces 2,7 of the rolling body 1 are pressed when the bearing is axially loaded. When the rolling body is loaded only with a radial force $Q_r$, the tension distribuover the rolling body will be in principle as shown graphically with $S_1$. One can see that the end parts of the envelope surface of the rolling body are tension-free. If the rolling body is also subjected to an axial load $Q_a$, see FIG. 2, the position of the tension distribution over the rolling body will change which is indicated by $S_2$. If $Q_a$ increases, $S_2$ will gradually be moved all the way out to the end part of the rolling body, and if $Q_a$ is then further increased, a tension concentration will occur there, whereby the life length of the bearing will decrease. As long as $Q_a$ is lower than the value which causes the area $S_2$ to reach the end part of the rolling body, the axial load $Q_a$ does not affect the life length of the raceways.

If the axial load shall not reduce the total life length of the bearing, the life length of the parts subjected to axial load must be long compared to the life length of the raceways. This is achieved by curving the flanges and/or those parts of the roller ends which contact the flanges in such a way that the tension occuring in the contact spot are kept low and at the same time the surfaces are separated by hydrodynamic pressure build-up of a lubricant. An example of such a design is the combination shown in the drawing, i.e. with a spherical roller end surface 2,7 and a tapered flange surface 4,6, but also other designs of the respective surfaces are of course possible.

Figure 3:
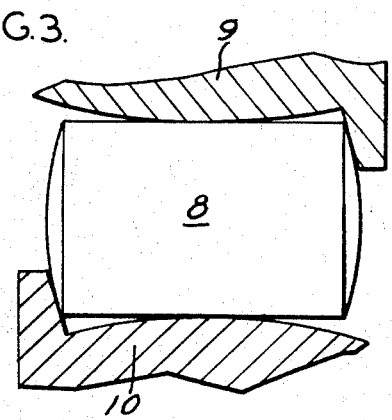
FIGS. 3, 4 and 5 are fragmentary sectional views of a portion of other embodiments of a rolling bearing constructed in accordance with the present invention.

In FIG. 3 an embodiment is shown with a cylindrical rolling body 8 and crowned raceways 9, 10, which embodiment gives the same advantages as the embodiments with drowned rolling bodies and cylindrical raceways.

Figure 4:
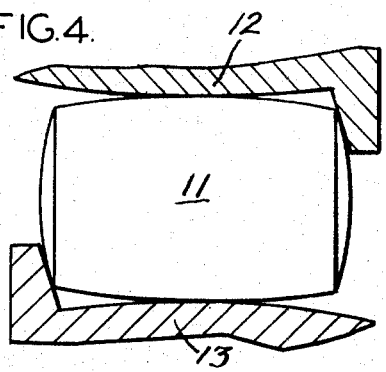
Figure 5:
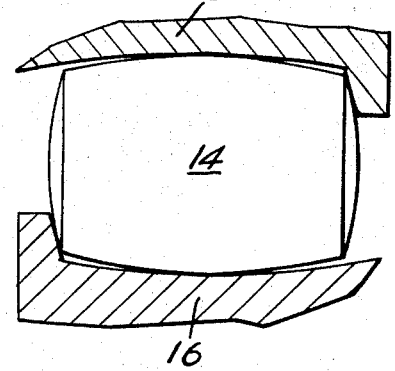

In FIGS. 4 and 5 two more embodiments are shown where both the rolling bodies 11, 14 and the raceways 12, 13, 15, 16 are crowned. In the embodiment according to FIG. 4, the crowning radii can be made larger than in those cases where only the rolling bodies are crowned or where both details are crowned according to FIG. 5.

For a given bearing, radially loaded with the force $F_r$, it can be calculated which crowning radius is necessary for the life length of the raceways not to be affected by axial loads not exceeding $\beta F_r$, when $\beta$ is a number mostly between 0 and 1.

EXAMPLE

Bearing data:
| | |
|---|---|
| Mean diameter | 112,5 mm |
| Number of rows of rolling bodies | 1 |
| Number of rollers | 11 |
| Roller diameter | 23 mm |
| Roller length | 23 mm |

For $F_r = 4,320$ kp and $\beta = ⅓$ a crowning radius of 1,506 mm is required. At this crowning radius, the life length of the raceways at a radial load of 4,320 kp will thus be independent of the axial load as long as this is less than 4320/3 = 1,449 kp.

Figure 6:
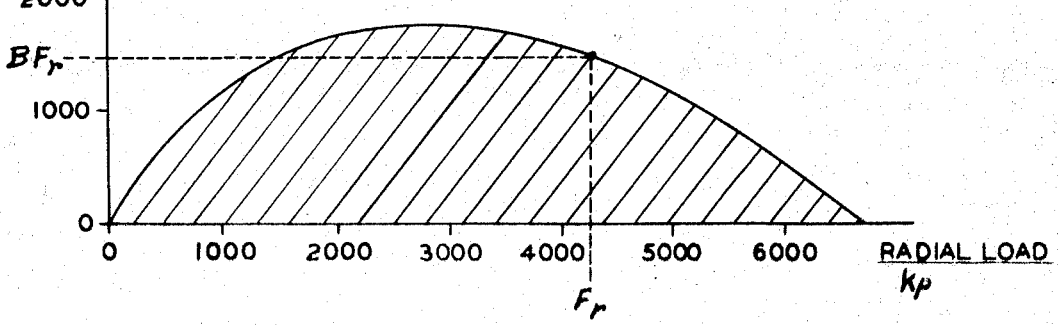
FIG. 6 is a chart plotting axial and radial load and showing a range within which the life length of the raceways of the bearing assembly is independent of the axial load.

The conditions at this and other radial loads and load combinations is shown in FIG. 6. For load combinations within the dashed area the life length of the raceways is independent of the axial load.

The invention is not limited to the above-described embodiment with, e.g. one row of rollers and spherical end surfaces of the rollers and tapered flange surfaces of the outer and inner ring, but also other embodiments are possible within the scope of the following claims.

I claim:

1. A cylindrical rolling bearing assembly comprising inner and outer ring members having confronting raceways, a plurality of rolling elements in the annular space between the raceways, each of said rolling elements having a peripheral surface confronting the raceways and sphered axial end faces, the inner ring member having at least one radial flange at one axial end thereof having a tapered surface confronting the axial end faces of the rolling elements, said outer ring member having a radial flange at one axial end thereof opposite the radial flange on the inner ring member and having a tapered surface confronting the axial end faces of the rolling elements, said raceways and peripheral surface of the rolling elements being of a predetermined configuration whereby the peripheral surface of said rolling elements adjacent the axial ends thereof is spaced from the raceways and thereby is not under load when the bearing assembly is subjected to a predetermined axial load.

2. Bearing according to claim 1 characterized by that the rolling elements are crowned and the raceways are cylindrical.

3. Bearing according to claim 1 characterized by that the rolling elements are cylindrical and the raceways are crowned.

4. Bearing according to claim 1, characterized by that both the rolling elements and the raceways are crowned.

5. A cylindrical rolling bearing assembly comprising inner and outer ring members having confronting raceways, a plurality of rolling elements in the annular space between the raceways, each of said rolling elements having a peripheral surface confronting the raceways and axial end faces, the inner ring member having at least one radial flange at one axial end thereof having a surface confronting the axial end faces of the rolling elements, said outer ring member, having a radial flange at one axial end thereof opposite the radial flange on the inner ring member and having a surface confronting the axial end faces of the rolling elements, the axial end faces of the rolling elements and the surface of the flanges confronting the axial end faces being of a predetermined configuration to provide hydrodynamic lubrication upon contact of the axial end faces of said rolling elements and the surface of the flanges, said raceways and peripheral surface of the rolling elements being of a predetermined configuration whereby the peripheral surface of said rolling elements adjacent the axial ends thereof, is spaced from the raceways and thereby is not under load when the bearing assembly is subjected to a predetermined axial load.

* * * * *